United States Patent
Hu et al.

(10) Patent No.: US 10,860,861 B2
(45) Date of Patent: Dec. 8, 2020

(54) DATA TRANSMISSION SYSTEM OF SAFETY PATROL ON CONSTRUCTION PROJECT SITE BASED ON "INTERNET PLUS"

(71) Applicant: Guangzhou Institute of Building Science Co., Ltd., Guangzhou (CN)

(72) Inventors: Hesong Hu, Guangzhou (CN); Jian Su, Guangzhou (CN); Zhongtian Lu, Guangzhou (CN); Junyi Wen, Guangzhou (CN); Zhuo Yang, Guangzhou (CN); Lingsheng Tan, Guangzhou (CN); Chaowen Wang, Guangzhou (CN); Jieming Li, Guangzhou (CN)

(73) Assignee: GUANGZHOU INSTITUTE OF BUILDING SCIENCE CO., LTD., Guangzhou (CN)

(*) Notice: Subject to any disclaimer, the term of this patent is extended or adjusted under 35 U.S.C. 154(b) by 124 days.

(21) Appl. No.: 16/245,756

(22) Filed: Jan. 11, 2019

(65) Prior Publication Data

US 2019/0236373 A1 Aug. 1, 2019

(30) Foreign Application Priority Data

Jan. 31, 2018 (CN) .......................... 2018 1 0096481

(51) Int. Cl.
*G06K 9/00* (2006.01)
*G08B 7/06* (2006.01)
(52) U.S. Cl.
CPC ..... *G06K 9/00718* (2013.01); *G06K 9/00201* (2013.01); *G08B 7/066* (2013.01)
(58) Field of Classification Search
CPC .......... G06K 9/00718; G06K 9/00201; G06K 9/00228; G06K 9/00288; G06K 9/6274;
(Continued)

(56) References Cited

U.S. PATENT DOCUMENTS 10,713,607 B2 * 7/2020 Pettersson .......... G06K 19/0723
2013/0155058 A1 * 6/2013 Golparvar-Fard ...... G06T 17/00
345/419

(Continued)

FOREIGN PATENT DOCUMENTS

| CN | 105915632 | * | 6/2016 | ............... G06F 3/01 |
| CN | 105915632 | A | 8/2016 | |
| CN | 107368967 | A | 11/2017 | |

*Primary Examiner* — Jose L Couso
(74) *Attorney, Agent, or Firm* — Muncy, Geissler, Olds & Lowe, P.C.

(57) ABSTRACT

The present disclosure discloses a data transmission system of safety patrol on construction project site based on "internet plus" according to the present disclosure comprises a patrol apparatus for collecting and transmitting an on-site panorama image, 3D point cloud data of the scene, location information and construction on-site data; a cloud computing platform for receiving the on-site panorama image, the 3D point cloud data of the scene, the location information and the construction on-site data, and reconstructing a 3D model of a patrol scene based on the panorama images, the 3D point cloud data of the scene, the location information and the construction on-site data; a safety patrol data terminal providing inspection/browse to construction site; the present disclosure enable users to patrol in construction project remotely, reducing workload of the safety production management personnel, improving patrol efficiency, enhancing the intuitive reality of the patrol and the safety patrol level of the construction project; the inspection result is transferred electronically, ensuring the time efficiency of project patrol inspection.

9 Claims, 2 Drawing Sheets

(58) Field of Classification Search
CPC ........... G06K 9/00711; G06K 9/00771; G06K 2209/40; G08B 7/066; G08B 25/003; G06N 20/00; G06T 17/00; G05B 19/048; G05B 19/41875; G05B 19/418; G05B 19/41865; H04L 41/0806; H04L 41/22; H04L 67/02; H04L 67/10; H04W 84/005; H04W 84/18; G06F 3/011; G06Q 50/08; G06Q 10/06395; G06Q 10/103; G06Q 10/06; G06Q 10/0631; G06Q 10/063114; G06Q 10/063118; G06Q 10/06312; G06Q 10/0633; G06Q 10/06398; G06Q 10/10; G06Q 10/1097

See application file for complete search history.

(56) References Cited

U.S. PATENT DOCUMENTS

| | | | |
|---|---|---|---|
| 2015/0381947 A1* | 12/2015 | Renkis | G08B 13/196 |
| | | | 348/159 |
| 2017/0097227 A1* | 4/2017 | Sanders | G01S 17/88 |
| 2017/0278030 A1* | 9/2017 | Pettersson | G06Q 50/08 |

* cited by examiner

DATA TRANSMISSION SYSTEM OF SAFETY PATROL ON CONSTRUCTION PROJECT SITE BASED ON "INTERNET PLUS"

CROSS-REFERENCE TO RELATED APPLICATIONS

This application claims priority to CN 201810096481.9, having a filing date of Jan. 31, 2018, the entire contents both of which are hereby incorporated by reference.

FIELD OF TECHNOLOGY

The present disclosure relates to the field of safety patrol on construction project site, in particular to a data transfer system of safety patrol on construction project site based on "internet plus".

BACKGROUND

On-site safety patrol refers to inspection of potential danger, harmful factors, risk factors and defects that may exist in construction projects. By application of on-site safety patrol, problems such as unsafe acts of workers, unsafe conditions of equipment, environmental harm or environmental pollution in construction work can be found to identify existence or state of potential danger, risk factors and defects, which is benefit for adopting technical/management countermeasures, eliminating potential danger and risk factors to ensure safety in engineering construction. Therefore, on-site safety patrol is an important part of work safety management of construction projects. However, current data of safety patrol is mainly transferred between departments via paper, which not only causes problems of inspection omission, difficult data retention and poor timeliness, but also leads to resource waste and increased management costs of enterprise. Besides, most construction enterprises have multiple projects under construction at the same time, therefore safety production management personnel are usually in charge of multiple projects that may be located in different provinces and cities, or even abroad with constantly changing situations on construction site everyday. Different site locations, variant construction period and complex site conditions lead to a heavy patrol work. If safety production management personnel cannot be present on multiple project sites on time for comprehensive and effective safety production management. It would cause great safety risk and potential danger.

SUMMARY

An object of the invention is to provide a data transmission system of safety patrol on construction project site based on "internet plus" to solve the aforementioned problems.

To achieve the above objects, technical solution of the present invention is given as follows.

The present disclosure provides a data transmission system of safety patrol on construction project site based on "internet plus", comprises, a patrol apparatus for collecting and transmitting on-site panorama images, 3D point cloud data of scene, location information and construction on-site data;

a cloud computing platform for receiving the on-site panorama images, 3D point cloud data of the scene, the location information as well as the construction on-site data, the a cloud computing platform is also configured for reconstructing a 3D model of a patrol scene based on the panorama image, 3D point cloud data of the scene, the location information and the construction on-site data; and a safety patrol data terminal for inspecting/browsing a construction site;

the aforementioned patrol apparatus transmits the information and data to the cloud computing platform via wireless network, then the information and data are processed by the cloud computing platform, and transmitted to the safety patrol data terminal via wireless network.

Further, the patrol apparatus comprises:

a wearable scene collector for collecting the on-site panorama image, 3D point cloud data of the scene, the location information and the potential danger evidence at the construction site during a patrol;

a handheld patrol device for displaying inspection items, receiving scene data and inspection data, recording patrol time and the location information, and shooting details of potential danger; and an external measuring tool for measuring data of the inspection items;

the wearable scene collector transmits the information and data to the handheld patrol device via wireless network, and the external measuring tool transmits the data to the handheld patrol device via wireless network.

Further, the wearable scene collector comprises a panoramic camera, a laser scanner and a wireless communication module;

the panoramic camera collects the on-site panoramic image which is transmitted to the handheld patrol device via the wireless communication module;

the laser scanner collects 3D point cloud data of the scene on site and transmits the data to the handheld patrol device via the wireless communication module.

Further, the handheld patrol device comprises a screen, a data processing module, a location device, a camera and a wireless communication module;

the screen displays the name and information of the inspection item;

the data processing module processes the data measured by the external measuring tool and transmits such data to the cloud computing platform via the wireless communication module;

the location device records the location information during patrol and transmits such information to the cloud computing platform via the wireless communication module;

the camera takes an image of the on-site detail and transmits such image to the cloud computing platform via the wireless communication module.

Further, the external measuring tool comprises a wireless laser rangefinder, a wireless multimeter, a wireless harmful gas concentration meter, a wireless radiometer and a wireless anemograph.

Further, the safety patrol data terminal comprises:

a patrol scene simulate device for receiving the information from the cloud computing platform and conducting a virtual and simulated patrol/browsing on the construction site;

a portable client for receiving the information from the cloud computing platform and browsing the construction site.

Further, patrol scene simulate device comprises a simulator, a pair of virtual reality (VR) glasses, a joystick and a voice input device.

Further, the portable client is a computer or mobile phone in which a safety production management program is installed.

Further, the present disclosure comprises a method of using such a data transmission system of safety patrol, comprising the following operation steps:

S1. creating a new construction project and making patrol schemes:

safety production management personnel establish patrol schemes through the safety patrol data terminal which subsequently sends patrol tasks to inspectors;

S2. accepting the patrol tasks and patrolling:

the safety patrol data terminal sends the patrol tasks to the inspectors, the inspectors accept the patrol tasks and use the patrol apparatus to collect the on-site panorama image, 3D point cloud data of the scene, the location information, evidences of potential danger and measured data, then the patrol apparatus transmits all those information and data to the cloud computing platform;

S3. reconstructing a 3D model of the patrol scene:

the cloud computing platform reconstructs a 3D model of the patrol scene based on the on-site panorama image, 3D point cloud data of the scene and the location information;

S4. Simulating on-site patrol process the cloud computing platform transmits such patrol scene data to the safety patrol data terminal, and the safety production management personnel conduct a patrol/browsing to the construction site, a potential danger information and a measured data through the safety patrol data terminal;

S5. analyzing the patrol results:

the safety production management personnel check whether all information from the on-site patrol of the construction project is qualified; if so, the cloud computing platform generates an on-site inspection report and correction information report of the project automatically based on the patrol scene data and correction information; if not, the safety production management personnel upload a correction request through the safety patrol data terminal which subsequently sends a correction notice to the project worker; when the correction is finished, the worker upload the correction information to the cloud computing platform, then the safety production management personnel re-establish a patrol scheme and re-arrange a patrol/inspection.

Further, the method of reconstructing a 3D model of the step S3 further comprises the following steps:

S31. transforming polar coordinates into rectangular coordinates:

Arranging observation stations at equal intervals on a patrol route recorded in a location data, establishing a plurality of relative polar coordinate systems whose origins are respective observation stations, and measuring a relative polar coordinate of each sampled point by the laser scanner, to form 3D point cloud data of the scene;

transforming the relative polar coordinate into a relative rectangle coordinate, through a formula;

S32. transforming the relative rectangle coordinates into absolute coordinates:

creating an absolute coordinate system with an origin where the laser scanner starts to scan;

transforming the relative rectangle coordinates obtain in S31 into absolute coordinates in the absolute coordinate system, through a formula;

S33. implementing 3D reconstruction by triangle meshing:

calculating a distance from a point $p_j$ in 3D point cloud to its nearby points through the cloud platform, to obtain a distance data set;

searching for three smallest numbers in the distance data set to get the corresponding three points, and interconnecting these four points to form triangles;

repeating the above two steps for all points in the point cloud until all the points in the point cloud are connected in such manner to form a plurality of triangles such that all edges of the triangles form triangular meshes to realize 3D model reconstruction of the patrol scene S34. Assigning image information to the 3D model:

slicing the point cloud in respective relative coordinate system through slice algorithm to obtain a series of point sets, that is, a family of planes is created along a given ridge line with its tangential as normal vector, and the contour line of the point cloud on each plane is calculated;

connecting the closest two points in turn in the sliced planes to approximately represent the partial contour of the model;

grouping point cloud slices in relative coordinate system into two slice sets based on the sliced plane perpendicular to the x-axis or the y-axis, the two slice sets are perpendicular to each other and their vertical intersecting contour lines divides the 3D model of the scene into meshes, each mesh is assigned corresponding image data/information which was acquired at the same location;

assigning image information to the meshes, that is, in the relative coordinate system, superimposing the images on each slice set in the same direction, as images in the same direction in the same relative coordinate are coincident; after superimposing, reserving the image data in the location where the image and the contour line of the slice is overlapped, and deleting the image data in the location where the image and the contour line cannot be overlapped, such that the image data on the contour line of the scene can be remained by selecting massive number of contour lines, then integrating the remained images data, and locating the image data of 3D scanning model in the relative coordinate system; subsequently transforming the positioning coordinates of the images data in the relative coordinate system into the absolute coordinates, and locating the images data of 3D model of whole patrol scene by mosaicking the 3D scanning model in each relative coordinate system, thereby completing the images rendering of 3D model of the patrol scene.

Compared with the prior art, the present disclosure has the following advantages.

The present disclosure provides a data transmission system of safety patrol on construction project site based on "internet plus". The patrol apparatus provided in the present disclosure may collect panorama images during patrol, 3D scene point cloud data, and some on-site data in respect of safety issue; the handheld patrol device is equipped with a camera capable of taking HD images/video of the nook/special places, then the images/video data will be sent to the cloud computing platform via wireless network, and the cloud computing platform sends those information to the safety patrol data terminal such that the patrol site can be recurred, whereby the safety production management personnel can perform a remote safety patrol in virtual patrol site, with intuitive reality feelings to the project safety situation. Meanwhile, the inspection result is transferred electronically, ensuring the time efficiency of project patrol inspection, and reducing waste of enterprise resources and management cost.

In conclusion, the data transmission system of safety patrol on construction project site based on "internet plus" according to the disclosure enables safety production management personnel to patrol in multiple construction projects remotely, reducing workload of the safety production management personnel, improving patrol efficiency, enhancing intuitive reality of the patrol and the safety patrol level of the construction project, and changing the workflow of the traditional on-site safety patrol. Therefore, the present disclosure holds broad application prospects in the field of construction on-site safety patrol.

BRIEF DESCRIPTION OF DRAWINGS

The embodiments of the present disclosure will be described in more detail with reference to the figures.

DETAILED DESCRIPTION OF PREFERRED EMBODIMENTS

The embodiments of the present disclosure will be described hereinafter with reference to figures. It should be understood that the preferred embodiments are merely for illustration and do not mean to limit the protection scope of the disclosure.

The data transmission system of safety patrol on construction project site based on "internet plus" according to the present disclosure comprises a patrol apparatus A, a cloud computing platform B and a safety patrol data terminal C.

Figure 1:
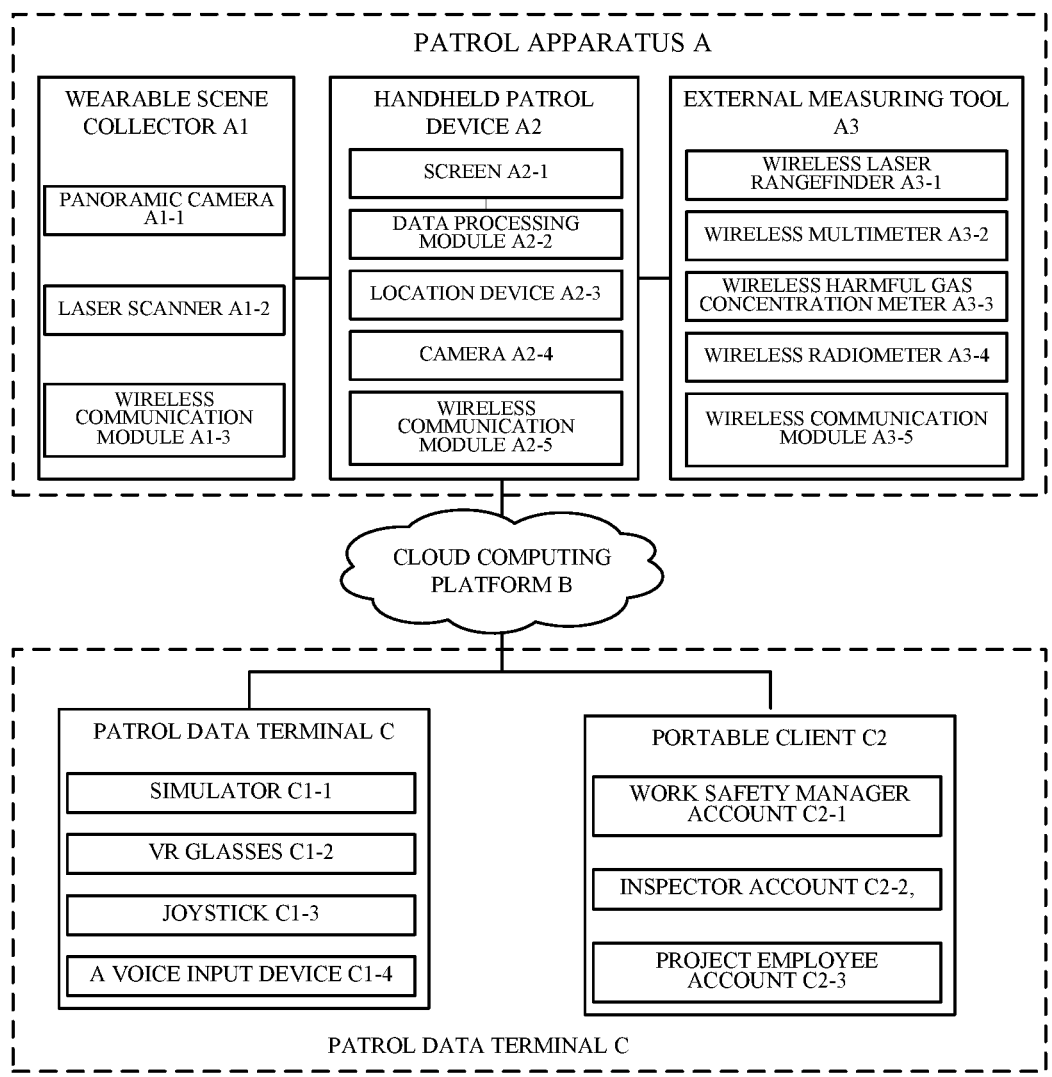
FIG. 1 is a block diagram showing a data transmission system of safety patrol on construction project site based on "internet plus" according to an embodiment of the present disclosure.
Figure 2:
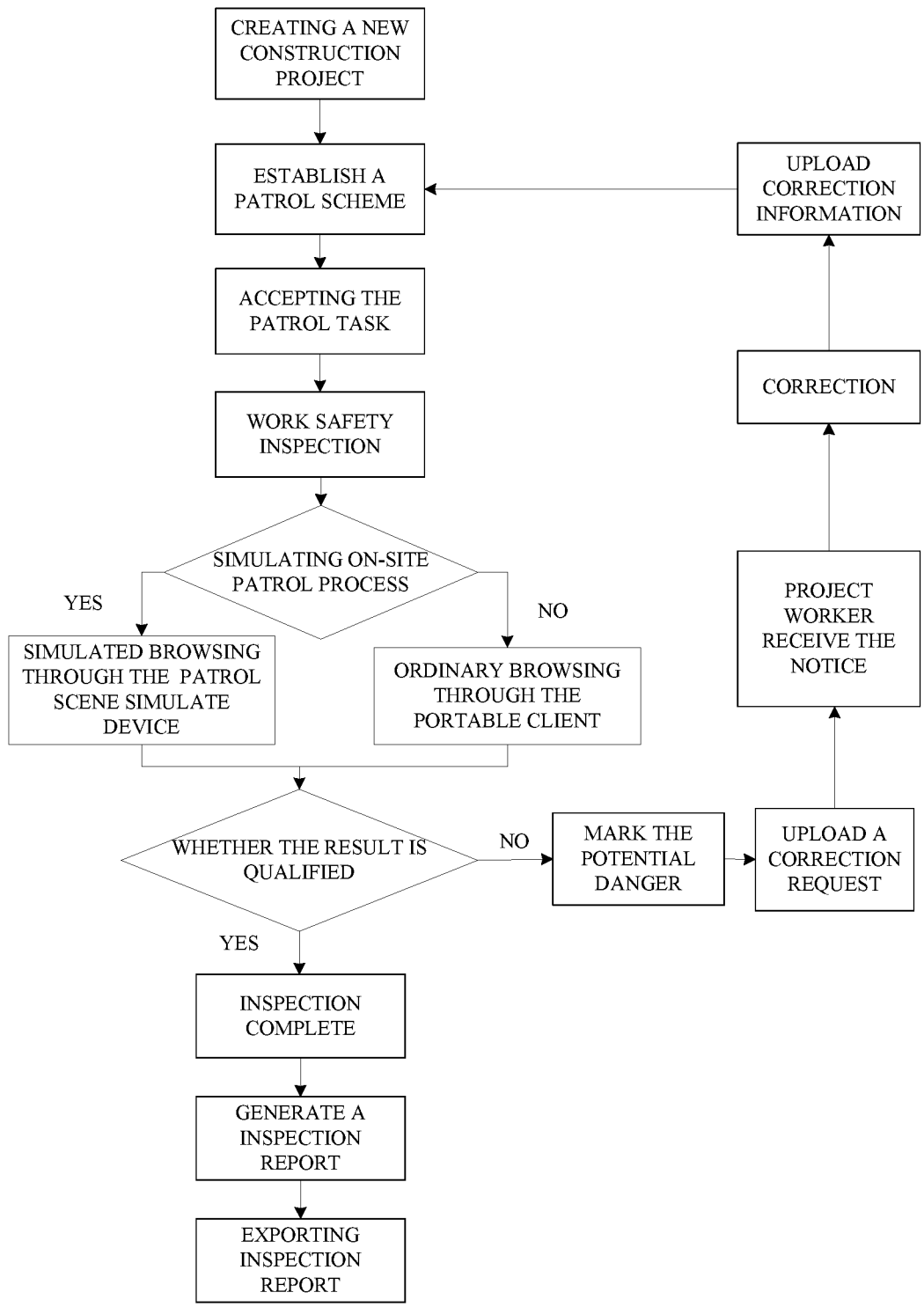
FIG. 2 is a workflow diagram showing work safety inspection performed by a data transmission system of safety patrol on construction project site based on "internet plus" according to an embodiment of the present disclosure.

As shown in FIG. 1, the patrol apparatus A comprises a wearable scene collector A1, a handheld patrol device A2, and an external measuring tool A3; wherein the wearable scene collector A1 comprises a panoramic camera A1-1, a laser scanner A1-2 and a wireless communication module A1-3; the handheld patrol device A2 comprises a screen A2-1, a data processing module A2-2, a location device A2-3, a camera A2-4, and a wireless communication module A2-5; the external measuring tool A3 comprises a wireless laser rangefinder A3-1, a wireless multimeter A3-2, a wireless harmful gas concentration meter A3-3, a wireless radiometer A3-4 and a wireless anemograph A3-5.

The safety patrol data terminal C comprises a patrol scene simulate device C1 and a portable client C2, wherein the patrol scene simulate device C1 comprises a simulator C1-1, virtual reality (VR) glasses C1-2, a joystick C1-3 and a voice input device C1-4; the portable client C2 may create three types of accounts comprising a safety production management personnel account C2-1, an inspector account C2-2, and a project worker account C2-3.

The use of the data transmission system of safety patrol on construction project site based on "internet plus" in the present disclosure comprises the following five steps in actual practice:

S1. Creating a New Construction Project and Making Patrol Scheme.

The safety production management personnel may use a safety production management personnel account C2-1 to login the portable client terminal C2, to create a new construction project, input basic information data of the project, upload scanned files of the project and establish a patrol scheme of the project; the portable client C2 may send the project information data and the patrol scheme to the cloud computing platform B via network, the cloud computing platform B may send the patrol task to the inspector account C2-2 according to the patrol scheme.

S2. Accepting the Patrol Task and Patrolling.

The inspector may use an inspector account C2-2 to login the portable client terminal C2, accept the patrol task, review the list of patrol contents, and start the work safety inspection item by item; during this process, the inspector may wear the wearable scene collector A1 to conduct a patrol to the construction site, that is, the inspector may perform 360° panoramic image acquisition of the construction site by the panoramic camera A1-1 inside the wearable scene collector, and send collected images to the handheld patrol device A2 via the wireless communication module A1-3; meanwhile, the laser scanner A1-2 inside the wearable scene collector may also record the 3D point cloud data of the scene and send the data to the handheld patrol device A2 via the wireless communication module A1-3;

The inspector may carry the external measuring tool A3 comprising a wireless laser rangefinder A3-1, a wireless multimeter A3-2, a wireless harmful gas concentration meter A3-3, a wireless radiometer A3-4 and a wireless anemograph A3-5, to inspect various safety data on site and send the data to the data processing module A2-2 inside the handheld patrol device A2 for processing via a wireless network;

Meanwhile, the inspector may inspect all details on the site using the handheld patrol device A2 wherein the camera A2-4 is arranged therein for taking images of potential danger on site, e.g. wire intertwist issues, instruments malfunction, unfirmly mounted components in a supporter, and the like, as evidences; the location device A2-3 arranged inside the handheld patrol device A2 may record the locations where the inspector went across.

In the end, the handheld patrol device A2 may send the collected data, including the images and the 3D point cloud data of the scene collected by the wearable scene collector, the measurements from the external measuring tool A3, and the images and location data collected by the handheld patrol device A2, to the cloud computing platform B via the wireless communication module A2-5.

S3. Reconstructing 3D Model.

The cloud computing platform B may receive the real-time data from the handheld patrol device A2 via a wireless network for reconstructing a 3D model of the patrol scene based on the panorama image, the 3D point cloud data of the scene and the location data, then send the real-time patrol scene data to the safety patrol data terminal C;

The steps of reconstructing a 3D model of the patrol scene based on the collected panorama image, 3D point cloud data of the scene and location data, performed by the cloud computing platform B, comprise:

S31. Transforming Polar Coordinates into Rectangular Coordinates.

Arranging observation stations at equal intervals on the patrol route recorded in the location data. The 3D point cloud data of the scene measured by the laser scanner A1-2 at each observation station comprises a radial distance R, a horizontal angel (p and a vertical angel θ of each sampling point in a polar coordinate system whose origin is the observation station. Each measured polar coordinate may be transformed into a relative rectangle coordinate through a coordinate computing formula, the calculated coordinates in the relative rectangle coordinate system form 3D point cloud data of the scene. The computing formula for transforming a polar coordinate to a relative rectangular coordinate is as follows:

$$x = R \cos \varphi \cos \theta$$

$$y = R \cos \theta \sin \varphi$$

$$z = R \sin \theta$$

S32. Transforming the Relative Coordinate into an Absolute Coordinate.

Creating an absolute coordinate system with an origin where the laser scanner A1-2 starts to scan;

Transforming the 3D point cloud data of the scene obtained in step S31, i.e. the calculated relative coordinates, into the absolute coordinates through the following coordinate transform formula, such that the entire 3D point cloud data of the scene in the absolute coordinates can be obtained.

$$\begin{bmatrix} X \\ Y \\ Z \end{bmatrix} = \xi \begin{bmatrix} x \\ y \\ z \end{bmatrix} + \begin{bmatrix} \Delta x \\ \Delta y \\ \Delta z \end{bmatrix}$$

$$\xi = \begin{bmatrix} \cos\alpha_1 & \sin\alpha_1 & 0 \\ \sin\alpha_1 & \cos\alpha_1 & 0 \\ 0 & 0 & 1 \end{bmatrix} \begin{bmatrix} \cos\beta_1 & 0 & -\sin\beta_1 \\ 0 & 1 & 0 \\ -\sin\beta_1 & 0 & \cos\beta_1 \end{bmatrix} \begin{bmatrix} 1 & 0 & 0 \\ 0 & \cos\gamma_1 & \sin\gamma_1 \\ 0 & -\sin\gamma_1 & \cos\gamma_1 \end{bmatrix}$$

wherein x, y, z are point coordinates of the target points in absolute coordinate system, ($\Delta x$, $\Delta y$, $\Delta z$) is differences between the origin of the relative coordinate system and the origin of the absolute coordinate system, $\alpha_1$, $\beta_1$, $\gamma_1$ are rotation parameters between each relative coordinate system and the absolute coordinate system.

S33. Implementing 3D Reconstruction by Triangle Meshing.

The cloud platform can calculate a distance from a point $p_j$ ($x_j$, $y_j$, $z_j$) in 3D point cloud to the nearby points, to obtain a distance data set through the following distance formula:

$$d = \sqrt{(X-X_j)^2 + (Y-Y_j)^2 + (Z-Z_j)^2}$$

Searching for 3 smallest numbers in the distance data set to get the corresponding three points, and interconnecting these four points (3 points and the point $p_j$) to form triangles, then repeating the above steps for all points in the point cloud until all points in the point cloud are connected in such manner to form a plurality of triangles; all edges of the triangles form the triangular meshes to realize 3D model reconstruction of the patrol scene.

S34. Assigning an Image Information to the 3D Model.

The cloud computing platform may assign an image information to the reconstructed 3D model.

The point cloud in each relative coordinate system is processed by slicing process through slice algorithm. The point cloud slicing means that, a family of planes is created along a given ridge line with its tangential as normal vector, and the contour line of the point cloud on each plane is calculated.

The point cloud slices are created by following method.

A scattered points set $S = \{p_1 \, p_2 \ldots p_n\}$, $p_i = \{x_i, y_i, z_i\} \in R^3$, then the creation of the point cloud slices may be described as follows.

The 3D points cloud is divided by a set of parallel planes along a given direction, then the 3D point sets are converted into 2D slices data, the range of the point set S is $$\{x_{max}\,y_{max}\,z_{max}\} \sim \{x_{min}\,y_{min}\,z_{min}\}$$

A plane set T parallel to the yoz plane with its normal vector n pointing to the positive direction of the X axis is identified by a set of coordinate sequences: $x = \{x_0, x_1, x_2, \ldots x_n\}$, wherein $x_0 < x_1 \ll x_n$, $$x_0 = x_{min},$$

$$x_n = x_{max},$$

$$x_k = x_0 + i \times x_{pitch}(i=1,2,3,\ldots,n-1)$$

$x_{pitch}$ is the thickness of the slice, smaller thickness helps more accurate reconstruction of the scene contour.

Similarly, $$y_k = y_0 + i \times y_{pitch}(i=1,2,3,\ldots,n-1)$$

A series of point sets are obtained by the slice algorithm, and the partial contour of the model can be represented approximately by connecting the closest two points in turn in the sliced planes.

Grouping point cloud slices in relative coordinate system into two slice sets based on the sliced plane perpendicular to the x-axis or the y-axis, the two slice sets are perpendicular to each another and their vertical intersecting contour lines divides the scene 3D model into meshes, each mesh is assigned the corresponding image data/information which was acquired at the same location;

The method of assigning image information to the meshes is as follows:

In each relative coordinate system, superimposing the images on each slice set in the same direction, as the images in the same direction in the same relative coordinate are coincident. After superimposing, reserving the image data in the location where the image and the contour line of the slice is overlapped, and deleting the image data in the location where the image and the contour line cannot be overlapped, such that the images data on the contour line of the scene can be remained by selecting massive number of contour lines, then integrating the remained images data, and locating the images data of 3D scanning model in the relative coordinate system. Subsequently transforming the positioning coordinates of the images data in the relative coordinate system into the absolute coordinates, and locating the images data of 3D model of whole patrol scene by mosaicking the 3D scanning model in each relative coordinate system, thereby completing the images rendering of 3D model of the patrol scene.

S4. Simulating on-Site Patrol Process.

The cloud computing platform send the patrol scene data to the safety patrol data terminal C, the simulator C1-1 in the safety patrol data terminal C may send data to the cloud computing platform B via wireless network in order to interact with the cloud computing platform B, and may send patrol scene data to the VR glasses C1-2. The safety production management personnel can wear the VR glasses C1-2 to conduct a virtual and simulate browsing to the patrol site, that is, the safety production management personnel can see a 3D scene of the patrol site through the VR glasses C1-2, even like walking in the scene by operating the joystick C1-3, meanwhile the safety production management personnel may also review the inspection data, mark the potential danger, input the demand, check the correction information, indicate the potential danger or clarify the demand through the voice input device C1-4.

If the safety production management personnel fail to participate in the simulated patrol, the portable client C2 may provide an ordinary browsing which is the images of the whole patrol.

S5. Analyzing the Patrol Results

After the safety patrol, the safety production management personnel check whether all information from the on-site patrol of the construction project is qualified. If so, the cloud computing platform B generates an on-site inspection report and correction information report of the project automatically based on the patrol scene data and correction information, and the on-site safety patrol is complete. If not, the safety production management personnel will request for correction, and the safety patrol data terminal C sends the request to the cloud computing platform B, which subsequently sends a request notice to the project worker account C2-3, accordingly the project worker can receive the notice by login their project worker account C2-3 via the portable client C2, and implement the correction thereafter, then the correction information will be uploaded, whereby the safety production management personnel can check the correction information and re-arrange an inspector for patrol again to inspect the correction situation. If the correction is qualified, the inspection is complete, otherwise the project worker will be required for further correction.

The foregoing is merely the specific embodiments of the present invention, and is not intended to limit the protection scope of the present invention. Any replacement or improvement made without departing from the concept of the present invention is within the protection scope of the present invention.

What is claimed is:

1. A data transmission system of safety patrol on construction project site based on "internet plus", comprising
   a patrol apparatus for collecting and transmitting an on-site panorama image, 3D point cloud data of scene, location information and construction on-site data;
   a cloud computing platform for receiving the on-site panorama image, the 3D point cloud data of scene, the location information as well as the construction on-site data, and reconstructing a 3D model of a patrol scene based on the panorama image, the 3D point cloud data of scene, the location information and the construction on-site data; and
   a safety patrol data terminal for inspecting/browsing a construction site;
   the patrol apparatus for transmitting the location information and data to the cloud computing platform via wireless network, then the location information and data are processed by the cloud computing platform, and transmitted to the safety patrol data terminal via wireless network;
   wherein
   the patrol apparatus comprises
   a wearable scene collector for collecting the on-site panorama image, the 3D point cloud data of scene, the location information and a potential danger evidence at the construction site during a patrol;
   a handheld patrol device for displaying an inspection item, receiving scene data and inspection data, recording a patrol time and the location information, and shooting details of potential danger; and
   an external measuring tool for measuring data of the inspection item:
   the wearable scene collector transmits the location information and data tot he handheld patrol device via wireless network, and the external measuring tool transmits the data to the handheld patrol device via wireless network.

2. The data transmission system of safety patrol according to claim 1, wherein the wearable scene collector comprises a panoramic camera, a laser scanner and a wireless communication module, wherein
   the panoramic camera collects the on-site panoramic image which is transmitted to the handheld patrol device via the wireless communication module;
   the laser scanner collects the 3D point cloud data of scene on site and transmits the data to the handheld patrol device via the wireless communication module.

3. The data transmission system of safety patrol according to claim 1, wherein the handheld patrol device comprises a screen, a data processing module, a location device, a camera and a wireless communication module, wherein
   the screen displays name and information of the inspection item;
   the data processing module processes the data measured by the external measuring tool and transmits such data to the cloud computing platform via the wireless communication module;
   the location device records the location information during patrol and transmits such information to the cloud computing platform via the wireless communication module;
   the camera takes an image of on-site in details and transmits such image to the cloud computing platform via the wireless communication module.

4. The data transmission system of safety patrol according to claim 1, wherein the external measuring tool comprises a wireless laser rangefinder, a wireless multimeter, a wireless harmful gas concentration meter, a wireless radiometer and a wireless anemograph.

5. The data transmission system of safety patrol according to claim 1, wherein the safety patrol data terminal comprises
   a patrol scene simulate device for receiving information from the cloud computing platform and conducting a virtual and simulated patrol/browsing to the construction site;
   a portable client for receiving the information from the cloud computing platform and providing an ordinary browsing to the construction site.

6. The data transmission system of safety patrol according to claim 5, wherein the patrol scene simulate device comprises a simulator, a pair of virtual reality (VR) glasses, a joystick and a voice input device.

7. The data transmission system of safety patrol according to claim 5, wherein the portable client is a computer or mobile phone in which a work safety manage program is installed.

8. A method of using the data transmission system of safety patrol according to claim 1, comprising the following operation steps:
   S1. safety production management personnel establish a patrol scheme through the safety patrol data terminal which subsequently sends a patrol task to an inspector;
   S2 the safety patrol data terminal sends the patrol task to the inspector, the inspector accepts the patrol task and uses the patrol apparatus to collect the on-site panorama image, the 3D point cloud data of scene, the location information, a potential danger evidence and a measured data, then the patrol apparatus transmits those all information and data to the cloud computing platform;
   S3. the cloud computing platform reconstructs a 3D model of patrol scene based on the on-site panorama image, the 3D point cloud data of scene and the location information;

S4. the cloud computing platform transmits such patrol scene data to the safety patrol data terminal, and the safety production management personnel conduct a patrol/browsing to the construction site, a potential danger information and a measured data through the safety patrol data terminal;

S5. the safety production management personnel check whether all information from on site patrol of the construction project is qualified; if so, the cloud computing platform generates an on-site inspection report and correction information report of project automatically based on patrol scene data and correction information; if not, the safety production management personnel upload a correction request through the safety patrol data terminal which subsequently sends a correction notice to a project worker; when correction is finished, the project worker upload rectification information to the cloud computing platform, then the safety production management personnel re-establish a patrol scheme and re-arrange a patrol/inspection.

9. The method according to claim 8, wherein the step S3 further comprises the following steps:

S31. Arranging observation stations at equal intervals on a patrol route recorded in a location data, establishing a plurality of relative polar coordinate systems whose origins are respective observation stations, and measuring a relative polar coordinate of each sampled point by the laser scanner, to form 3D point cloud data of the scene;

transforming the relative polar coordinate into a relative rectangle coordinate, through a formula;

S32. creating an absolute coordinate system with an origin where the laser scanner starts to scan;

transforming the relative rectangle coordinates obtain in S31 into absolute coordinates in the absolute coordinate system, through a formula;

S33. calculating a distance from a point pj in 3D point cloud to its nearby points through cloud platform, to obtain a distance data set;

searching for three smallest numbers in the distance data set to get corresponding three points, and interconnecting these four points to form triangles;

repeating calculating, searching and interconnecting all points in the 3D point cloud until all points in the 3D point cloud are connected in such manner to form a plurality of triangles such that all edges of the triangles form triangular meshes to realize 3D model reconstruction of the patrol scene;

S34. slicing the 3D point cloud in respective relative coordinate system through slice algorithm to obtain a series of point sets, that is, a family of planes is created along a given ridge line with its tangential as normal vector, and contour line of the 3D point cloud on each plane is calculated;

connecting each point with another nearest point in turn in sliced planes to approximately represent partial contour of the model;

grouping point cloud slices in relative coordinate system into two slice sets based on sliced plane perpendicular to the x-axis or the y-axis, the two slice sets are perpendicular to each other and their vertical intersecting contour lines divides the 3D model of the scene into meshes, each mesh is assigned corresponding image data/information which was acquired at a same location;

assigning image information to meshes, that is, in the relative coordinate system, superimposing images on each slice set in a same direction, as images in the same direction in a same relative coordinate are coincident; after superimposing, reserving image data in a location where images and contour line of each point cloud slice is overlapped, and deleting image data in a location where images and the contour line cannot be overlapped, such that image data on the contour line of the scene can be remained by selecting massive number of contour lines, then integrating remained images data, and locating the image data of 3D scanning model in the relative coordinate system; subsequently transforming positioning coordinates of the images data in the relative coordinate system into absolute coordinates, and locating images data of 3D model of whole patrol scene by mosaicking a 3D scanning model in each relative coordinate system, thereby completing the images rendering of 3D model of the patrol scene.

* * * * *